United States Patent
Li et al.

(10) Patent No.: US 9,056,511 B2
(45) Date of Patent: Jun. 16, 2015

(54) METHOD AND APPARATUS FOR CALIBRATING SPOT COLOR

(75) Inventors: Haifeng Li, Beijing (CN); Xueyan Yan, Beijing (CN); Yuying Bai, Beijing (CN)

(73) Assignees: PEKING UNIVERSITY FOUNDER GROUP CO., LTD., Beijing (CN); PEKING UNIVERSITY, Beijing (CN); BEIJING FOUNDER ELECTRONICS CO., LTD., Beijing (CN); PEKING UNIVERSITY FOUNDER R&D CENTER, Beijing (CN)

( * ) Notice: Subject to any disclaimer, the term of this patent is extended or adjusted under 35 U.S.C. 154(b) by 0 days.

(21) Appl. No.: 14/129,799

(22) PCT Filed: May 18, 2012

(86) PCT No.: PCT/CN2012/075726
§ 371 (c)(1),
(2), (4) Date: Dec. 27, 2013

(87) PCT Pub. No.: WO2013/078837
PCT Pub. Date: Jun. 6, 2013

(65) Prior Publication Data
US 2014/0139585 A1    May 22, 2014

(30) Foreign Application Priority Data
Nov. 30, 2011   (CN) .......................... 2011 1 0390678

(51) Int. Cl.
*B41J 29/393*    (2006.01)
*H04N 1/46*    (2006.01)
*H04N 1/60*    (2006.01)

(52) U.S. Cl.
CPC .............. *B41J 29/393* (2013.01); *H04N 1/603* (2013.01)

(58) Field of Classification Search
CPC ....... B41J 29/393; B41J 3/407; H04N 1/6033
USPC .............................. 347/19; 358/1.9, 518, 504
See application file for complete search history.

(56) References Cited

U.S. PATENT DOCUMENTS

| | | | |
|---|---|---|---|
| 2008/0043263 A1 | 2/2008 | Hancock et al. | |
| 2011/0096330 A1 | 4/2011 | Dalal et al. | |
| 2011/0235141 A1 | 9/2011 | Shestak et al. | |
| 2013/0106936 A1* | 5/2013 | Shin et al. ....................... | 347/15 |

FOREIGN PATENT DOCUMENTS

| CN | 101518980 A | 9/2009 |
|---|---|---|
| CN | 101987529 A | 3/2011 |

OTHER PUBLICATIONS

PCT International Search Report for International Application No. PCT/CN2012/075726, filed May 18, 2012.

* cited by examiner

*Primary Examiner* — Jannelle M Lebron
(74) *Attorney, Agent, or Firm* — Garvey, Smith, Nehrbass & North, LLC; Seth M. Nehrbass; Julia M. FitzPatrick (57) ABSTRACT

The present invention provides a method for calibrating a spot color comprising: determining a target value for the spot color; and calibrating a printing device in an enumeration cycling manner, so that a spot color measurement value of a color block output by the printing device approximates the target value. The present invention further provides an apparatus for calibrating a spot color, comprising: a target module used for determining a target value for the spot color; a calibrating module used for calibrating a printing device in an enumeration cycling manner, so that a spot color measurement value of a color block output by the printing device approximates the target value. The present invention precisely calibrates the spot color of the printing device.

15 Claims, 3 Drawing Sheets

METHOD AND APPARATUS FOR CALIBRATING SPOT COLOR

TECHNICAL FIELD

The present invention relates to the field of printing, and in particular to a method and an apparatus for calibrating spot colors.

BACKGROUND

With increasingly demanding good qualities of printing products, spot colors are widely used, in particular, in packaging. When printing by an inkjet printing device, the implementing mechanism of a spot color differs from that of four colors. First, the color matching processes are different, because four-color printing focuses on a general printing effect while spot color printing aims to accurately simulate and reproduce a single spot color. Accurate simulation and spot color output are critical problems to be solved due to the large number and wide range of spot colors. Further, many spot colors are out of the color range of a printer, which causes a great difficulty to the digital printing. Therefore, the current spot color printing is usually performed in a conventional printing manner, which has the problems of time consuming, low efficiency and inaccurate simulation. Even if some digital printing software support the spot color print function, which usually relies on single-point calibration and lacks a good correction mechanism, so it is difficult to accurately reproduce the spot color.

A method for calibrating the spot color based on inkjet printing uses the colors of printing inks contained in the printer instead of a spot color printing ink to simulate a spot color. It will not guarantee the accuracy of simulation. During simulation, a chromatic aberration $\Delta E$ of CIE1976 L*a*b color space is used to determine the accuracy of simulation. A bigger value of chromatic aberration means a worse simulation of a spot color. There are many solutions to solve the problem of a large chromatic aberration, such as enlarging the color gamut of the printer, changing the paper, increasing the types of printing inks and so on, but these solutions will add the cost, have limitations in their application and could not function effectively without a good spot color calibration mechanism.

SUMMARY

The present invention intends to provide a method and a device for calibrating a spot color to solve the problem of inaccuracy of calibrating a spot color based on a single point.

A method for calibrating a spot color is provided in embodiments of the present invention, which comprises: determining a target value for the spot color; and calibrating a printing device in an enumeration cycling manner, so that a spot color measurement value of a color block output by the printing device approximates the target value.

A apparatus for calibrating a spot color is also provided in embodiments of the present invention, which comprises: a target module configured for determining a target value for the spot color; and a calibration module configured for calibrating a printing device in an enumeration cycling manner, so that a spot color measurement value of a color block output by the printing device approximates the target value.

The method and the apparatus according to the present invention realizes accurate spot color calibration of a printing device by calibrating the printing device in an enumeration cycling manner.

DETAILED DESCRIPTION

Hereinafter, the present application will be explained in detail with reference to the accompanying drawings in conjunction with the embodiments.

Figure 1:
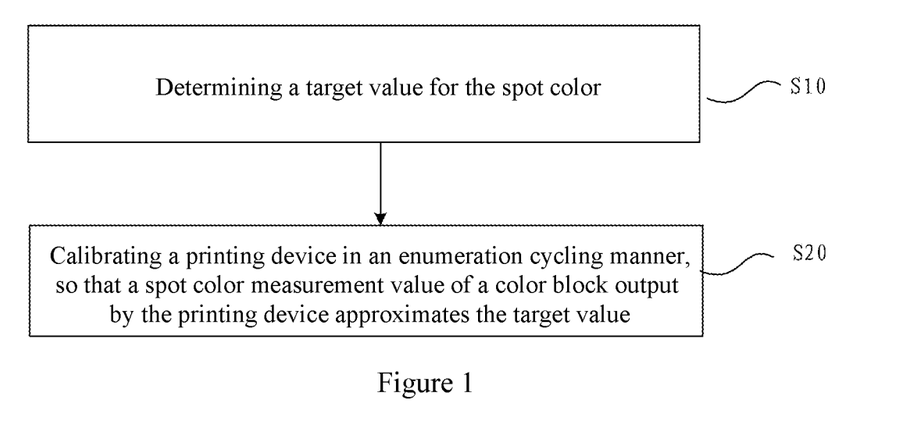
FIG. 1 is a schematic flow chart showing a method for calibrating a spot color according to an embodiment of the present application.

FIG. 1 illustrates a schematic flow chart showing a method for calibrating a spot color according to an embodiment of the present application. The method comprises a step of determining a target value for the spot color (S10); and a step of calibrating a printing device in an enumeration cycling manner, so that a spot color measurement value of a color block output by the printing device approximates the spot color target value (S20).

A single-point-based calibration is employed in the related arts, while an enumeration mechanism is adopted in the present invention. There is not a good calibration mechanism in related art, while a cycling manner is adopted in the present invention. In embodiments of the present invention, the output of the printing device could approximate the spot color target value more quickly and more precisely in an enumeration cycling manner.

Preferably, Step S10 further comprises a step of measuring a spot color block on a color card to obtain a color value as the target value for the spot color. Obviously, it is also possible to obtain the target value in other ways, such as by providing a particular chromaticity value for the spot color by a user.

Figure 2:
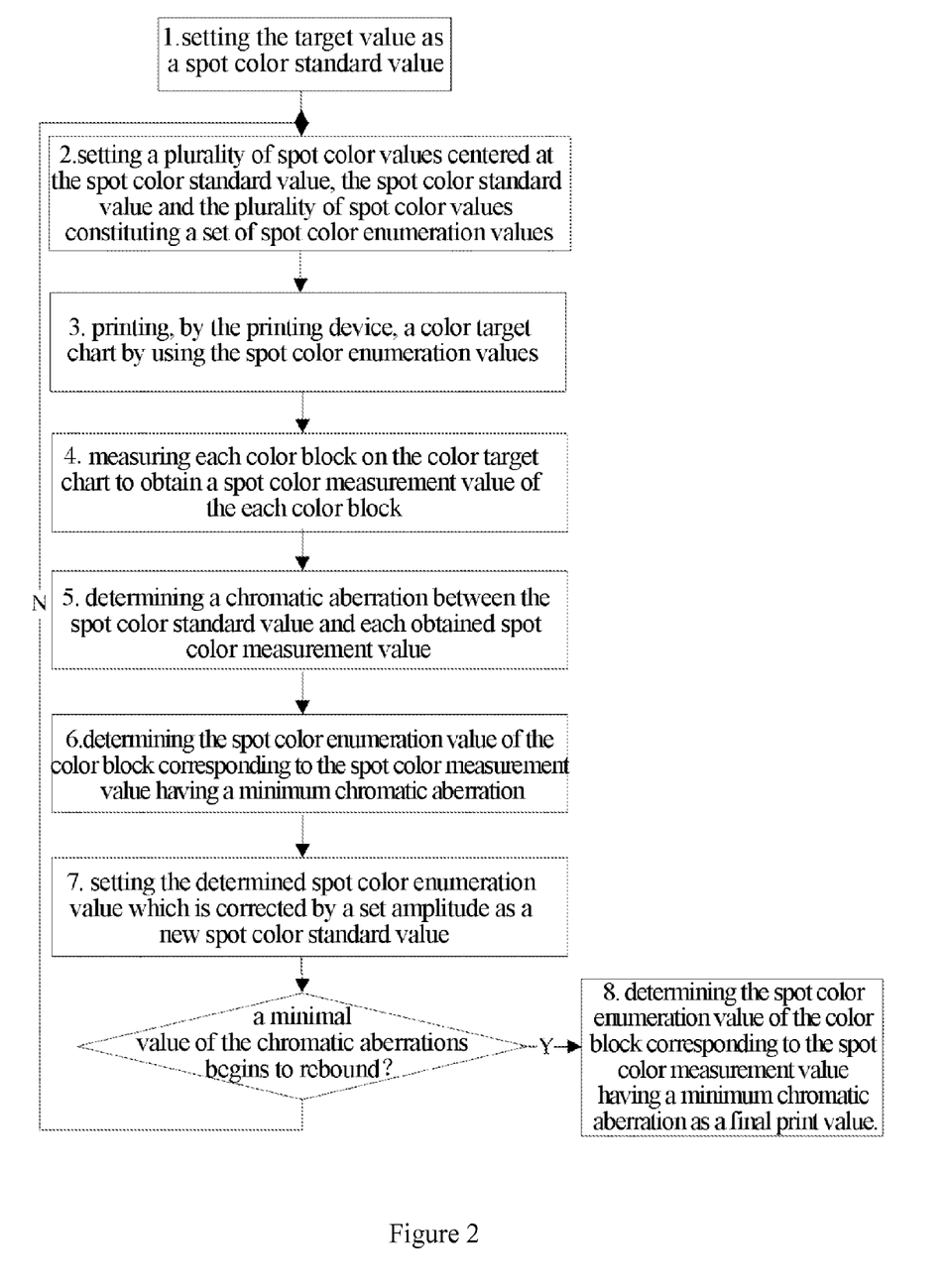
FIG. 2 is a schematic flow chart showing steps for calibrating a printing device in an enumeration cycling manner according to an preferred embodiment of the present application.

FIG. 2 is a schematic flow chart showing a process for calibrating a printing device in an enumeration cycling manner according to a preferred embodiment of the present application. The process comprises:

1) setting the spot color target value as a spot color standard value;

2) setting a plurality of spot color values centered at the spot color standard value, the spot color standard value and the plurality of spot color values constituting a set of spot color enumeration values;

3) using, by the printing device, the spot color enumeration values, to print so as to output a color target chart;

4) measuring each color block on the color target chart to obtain a spot color measurement value of the each color block;

5) determining a chromatic aberration between the spot color standard value and the each spot color measurement value;

6) determining the spot color enumeration value of the color block corresponding to the spot color measurement value having a minimum chromatic aberration;

7) setting the determined spot color enumeration value which is corrected by a set amplitude as a new spot color standard value;

8) repeating steps 2) to 7) until the minimal value of the chromatic aberrations begins to rebound, then stopping repeating and determining the spot color enumeration value of the color block corresponding to the spot color measurement value having a minimum chromatic aberration as a final print value.

The algorithm of this preferred embodiment is simple and is easy to be realized by a computer program.

Preferably, the printing device has a color space of Lab, and the step of setting a plurality of spot color values centered at the spot color standard value may comprise:

setting step sizes of Lab as:

$$L_{step\ i} = (L_{step\ 0}, \ldots, L_{step\ m-1})$$

$$a_{step\ i} = (a_{step\ 0}, \ldots, a_{step\ z-1})$$

$$b_{step\ i} = (b_{step\ 0}, \ldots, b_{step\ k-1})$$

where m, z, k represent numbers of step sizes of Lab respectively;

m*z*k spot color values are obtained by using spot color standard values $L_{std}$, $a_{std}$, $b_{std}$ as center and using $L_{step\ i}$, $a_{step\ i}$, $b_{step\ i}$ as step size.

The algorithm of this preferred embodiment is simple and is easy to be realized by a computer program. The common color space could be RGB, CMYK and so on in addition to Lab, and in theses cases the present invention could be carried out in the same way as the preferred embodiment of the color space of Lab. The repeated description will be omitted.

Preferably, the method further comprises: determining values of m, a, k based on the chromatic aberrations $\Delta L$, $\Delta a$, $\Delta b$ between $L_{std}$, $a_{std}$, $b_{std}$ and the spot color target values $L_{target}$, $a_{target}$, $b_{target}$, wherein m, z, k are ranked according to their values so as to correspond to a rank of $\Delta L$, $\Delta a$, and $\Delta b$.

If $\Delta L > \Delta a > \Delta b$, the numbers of step sizes of Lab are m, z, k respectively, i.e. the numbers of step sizes of Lab are:

$$L_{step\ i} = (L_{step\ 0}, \ldots, L_{step\ m-1})$$

$$a_{step\ i} = (a_{step\ 0}, \ldots, a_{step\ z-1})$$

$$b_{step\ i} = (b_{step\ 0}, \ldots, b_{step\ k-1})$$

If $\Delta L$ is the maximum, this means the simulation of brightness is inaccurate, and then a search region for luminance L in the current loop is enlarged to specifically calibrate to improve the calibration accuracy. In first loop, any item of L, a, b could be set having the maximal number of step sizes.

Preferably, the chromatic aberration between a spot color measurement value and a spot color target value could be determined as follows:

$$\Delta E_i = \sqrt{\Delta L_i^2 + \Delta a_i^2 + \Delta b_i^2}$$

$$i \in [0, n-1]$$

$$\Delta L_i = L_{measurement\ i} - L_{target}$$

$$i \in [0, n-1]$$

$$\Delta a_i = a_{measurement\ i} - a_{target}$$

$$i \in [0, n-1]$$

$$\Delta b_i = b_{measurement\ i} - b_{target}$$

$$i \in [0, n-1]$$

where $L_{measure\ i}$, $a_{measure\ i}$, $b_{measure\ i}$ are the measured chromaticity values of n color blocks, respectively.

Preferably, the step of correcting the determined spot color enumeration values $L_{enumeration}$, $a_{enumeration}$, $b_{enumeration}$ by a set amplitude to obtain a new spot color standard values is carried out by rule of:

$$L_{std} = L_{enumeration} - (L_{measurement} - L_{target}) * \text{rat}$$

$$\text{rat} \in [0, 1]$$

$$a_{std} = a_{enumeration} - (a_{measurement} - a_{target}) * \text{rat}$$

$$\text{rat} \in [0, 1]$$

$$b_{std} = b_{enumeration} - (b_{measurement} - b_{target}) * \text{rat}$$

$$\text{rat} \in [0, 1]$$

where $L_{measure}$, $a_{measure}$, $b_{measure}$ are the spot color measurement values corresponding to the minimum chromatic aberration, and rat is a set correction factor.

The algorithm of this preferred embodiment is simple and is easy to be realized by a computer program.

Figure 3:
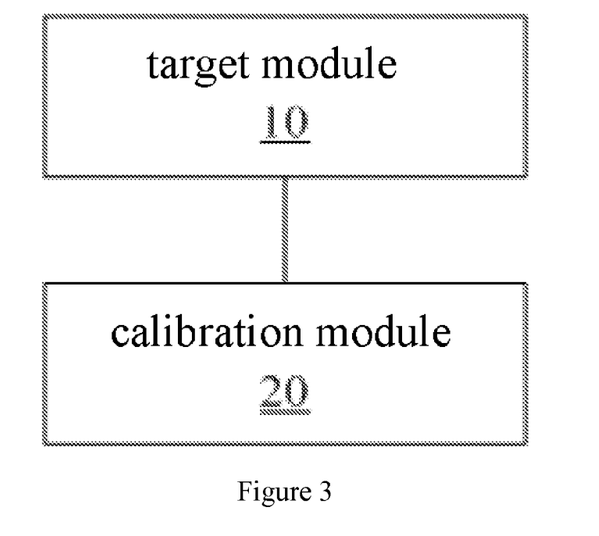
FIG. 3 is a schematic view showing an apparatus for calibrating a spot color according to an embodiment of the present application.

FIG. 3 is a schematic view showing an apparatus for calibrating a spot color according to an embodiment of the present application. The apparatus comprises a target module 10 configured for determining a target value for the spot color; and a calibration module 20 configured for calibrating a printing device in an enumeration cycling manner, so that a spot color measurement value of a color block output by the printing device approximates the spot color target value.

Preferably, the calibration module 20 comprises a standard value module, an enumeration value module, a color target module, a measurement module, a chromatic aberration module, a correction module and a control module.

The standard value module is configured to set the target value as a spot color standard value.

The enumeration value module is configured to set a plurality of spot color values centered at the spot color standard value, the spot color standard value and the plurality of spot color values constituting a set of spot color enumeration values.

The color target module is configured to enable the printing device to print a color target chart by using the spot color enumeration values.

The measurement module is configured to measure each color block on the color target chart to obtain a spot color measurement value of the each color block.

The chromatic aberration module is configured to determine a chromatic aberration between the spot color standard value and the each spot color measurement value.

The determination module is configured to determine a spot color enumeration value of the color block corresponding to the spot color measurement value having a minimum chromatic aberration.

The correction module is configured to set a determined spot color enumeration value which is corrected by a set amplitude as a new spot color standard value.

The control module is configured to control the enumeration module, the color target module, the measurement module, the chromatic aberration module, the determination module and the correction module to repeat the operation of the operations of determining and the operation of setting until the minimal value of the chromatic aberrations begins to rebound. And then the control module determines the spot color enumeration value of the color block corresponding to the spot color measurement value having a minimum chromatic aberration as a final print value.

Preferably, the printing device has a color space of Lab, and the step sizes of Lab set by the enumeration value module are:

$$L_{step\ i} = (L_{step\ 0}, \ldots, L_{step\ m-1})$$

$$a_{step\ i} = (a_{step\ 0}, \ldots, a_{step\ z-1})$$

$$b_{step\ i} = (b_{step\ 0}, \ldots, b_{step\ k-1})$$

where m, z, k are numbers of step sizes of Lab respectively;
$m*z*k$ spot color values are obtained by using spot color standard values $L_{std}$, $a_{std}$, $b_{std}$ as center and using $L_{step\ i}$, $a_{step\ i}$, $b_{step\ i}$ as step size.

The technical solution of the present invention will be exemplified by way of calibrating a spot color by an Epson inkjet printer in the following.

Experiment condition:
paper: Fantac 190
measurement device: X—Rite Eye-One iSis
output device: Epson Stylus Pro 7880

Step 1: Calculating and Outputting Chromaticity Values of n Spot Colors Around the Present Reference Spot Color The Lab coordinate values of the present target spot color are indicated by $L_{target}$, $a_{target}$, $b_{target}$, the standard Lab coordinate values in the present loop are indicated by $L_{std}$, $a_{std}$, $b_{std}$, and the standard Lab coordinate values in first loop are equal to the Lab coordinate values of the target spot color.

PANTONE 3425 CH in the PANTONE spot color library is chosen as the target spot color in the present embodiment, and its coordinate values are as follows:

$$L_{target} = 36.34, a_{target} = -39.89, b_{target} = 9.83.$$

(1) Determining a Search Region of Lab

Assuming that the number of step sizes of Lab is $m*z*k$, the relationship between L, a, b and m, z, k should be determined since m, z, k may be different, i.e., the search region of Lab is determined, when calculating the chromaticity values of n spot colors.

In the present embodiment, the number of step sizes of Lab is $3*3*k$, for example, i.e., k (k>3) is the biggest number of step sizes, and both of the numbers of other two step sizes are 3. In order to ensure the symmetry of n color blocks around the target spot color, the number of enumeration points and the biggest number of step sizes are chosen as follows:

$$n = m*z*k = 3*3*k$$

$$k = n/9.$$

The differences between a measurement value corresponding to the minimum color aberration in last loop and L, a, b of the Lab coordinate values of the target spot color are calculated in accordance with the following expressions:

$$\Delta L = |L_{measurement} - L_{std}|$$

$$\Delta a = |a_{measurement} - a_{std}|$$

$$\Delta b = |b_{measurement} - b_{std}|$$

where $L_{measure}$, $a_{measure}$, $b_{measure}$ represent the measurement values corresponding to chosen color blocks in last loop;

k is the number of step size of a item corresponding to the biggest value among $\Delta L$, $\Delta a$ and $\Delta b$, which means the largest search region.

(2) Calculating Chromaticity Values of n Spot Colors

The default number of step sizes of L is the biggest and is k in first loop, and the Lab coordinate values are calculated in accordance with the following expressions:

The L coordinate value is given by:

$$L_{print\ i} = L_{std} + L_{step\ j}$$

$$i \in [9*j, 9*j+8], j \in [0, k-1]$$

where $L_{step}$ is chosen from k values of step size of L.
The coordinate value is given by:

$$a_{print\ i} = \begin{cases} a_{std} + a_{step2} & i \in [9*j+6, 9*j+8] \\ a_{std} + a_{step1} & i \in [9*j+3, 9*j+5] \\ a_{std} - a_{step0} & i \in [9*j, 9*j+2] \end{cases}$$

$$j \in [0, k-1]$$

where $a_{step\ 0}$, $a_{step\ 1}$, $a_{step\ 2}$ are the values of step size of a.
The b coordinate value is given by:

$$b_{print\ i} = \begin{cases} b_{std} + b_{step2} & i = 9*j+2 \\ b_{std} + b_{step1} & i = 9*j+1 \\ b_{std} - b_{step0} & i = 9*j \end{cases}$$

$$j \in [0, n/3 - 1]$$

where $b_{step\ 0}$, $b_{step\ 1}$, $b_{step\ 2}$ are the values of step size of b.
In the present embodiment, the parameters in the above expressions are set as follows:

$$n = 54; k = 6$$

$$L_{step\ 0}, \ldots, L_{step\ 5} = -2, -1, 0, 0.5, 1, 2$$

$$a_{step\ 0}, a_{step\ 1}, a_{step\ 2} = -1, 0, 1$$

$$b_{step\ 0}, b_{step\ 1}, b_{step\ 2} = -1, 0, 1$$

The calculated Lab coordinate values of 54 spot colors of first loop are as shown in the below table 1:

TABLE 1

| coordinate values of 54 spot colors of first loop | | | |
|---|---|---|---|
| order | L | A | B |
| 1 | 34.34 | −40.89 | 8.83 |
| 2 | 34.34 | −40.89 | 9.83 |
| 3 | 34.34 | −40.89 | 10.83 |
| 4 | 34.34 | −39.89 | 8.83 |
| 5 | 34.34 | −39.89 | 9.83 |
| 6 | 34.34 | −39.89 | 10.83 |
| 7 | 34.34 | −38.89 | 8.83 |
| 8 | 34.34 | −38.89 | 9.83 |
| 9 | 34.34 | −38.89 | 10.83 |
| 10 | 35.34 | −40.89 | 8.83 |
| 11 | 35.34 | −40.89 | 9.83 |
| 12 | 35.34 | −40.89 | 10.83 |
| 13 | 35.34 | −39.89 | 8.83 |
| 14 | 35.34 | −39.89 | 9.83 |
| 15 | 35.34 | −39.89 | 10.83 |
| 16 | 35.34 | −38.89 | 8.83 |
| 17 | 35.34 | −38.89 | 9.83 |
| 18 | 35.34 | −38.89 | 10.83 |
| 19 | 36.34 | −40.89 | 8.83 |
| 20 | 36.34 | −40.89 | 9.83 |
| 21 | 36.34 | −40.89 | 10.83 |
| 22 | 36.34 | −39.89 | 8.83 |
| 23 | 36.34 | −39.89 | 9.83 |
| 24 | 36.34 | −39.89 | 10.83 |
| 25 | 36.34 | −38.89 | 8.83 |
| 26 | 36.34 | −38.89 | 9.83 |

TABLE 1-continued coordinate values of 54 spot colors of first loop

| order | L | A | B |
|---|---|---|---|
| 27 | 36.34 | −38.89 | 10.83 |
| 28 | 36.84 | −40.89 | 8.83 |
| 29 | 36.84 | −40.89 | 9.83 |
| 30 | 36.84 | −40.89 | 10.83 |
| 31 | 36.84 | −39.89 | 8.83 |
| 32 | 36.84 | −39.89 | 9.83 |
| 33 | 36.84 | −39.89 | 10.83 |
| 34 | 36.84 | −38.89 | 8.83 |
| 35 | 36.84 | −38.89 | 9.83 |
| 36 | 36.84 | −38.89 | 10.83 |
| 37 | 37.34 | −40.89 | 8.83 |
| 38 | 37.34 | −40.89 | 9.83 |
| 39 | 37.34 | −40.89 | 10.83 |
| 40 | 37.34 | −39.89 | 8.83 |
| 41 | 37.34 | −39.89 | 9.83 |
| 42 | 36.84 | −39.89 | 10.83 |
| 43 | 37.34 | −38.89 | 8.83 |
| 44 | 37.34 | −38.89 | 9.83 |
| 45 | 37.34 | −38.89 | 10.83 |
| 46 | 38.34 | −40.89 | 8.83 |
| 47 | 38.34 | −40.89 | 9.83 |
| 48 | 38.34 | −40.89 | 10.83 |
| 49 | 38.34 | −39.89 | 8.83 |
| 50 | 38.34 | −39.89 | 9.83 |
| 51 | 38.34 | −39.89 | 10.83 |
| 52 | 38.34 | −38.89 | 8.83 |
| 53 | 38.34 | −38.89 | 9.83 |
| 54 | 38.34 | −38.89 | 10.83 |

(3) Outputting n Spot Color Blocks

Figure 4:
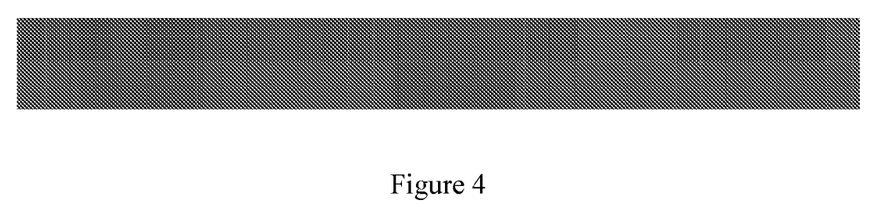
FIG. 4 is a color target chart showing 54 spot color blocks according to a preferred embodiment of the present application.

FIG. 4 illustrates 54 spot colors searched on basis of the standard value, each of which corresponds to a spot color value. Since the Lab coordinate values are different, there are light and dark variations between color blocks. Then a color target chart is printed by a inkjet printing device, which comprises the n spot colors for each of which a name, parameters, for example, transparency, color gamut and so on, is designated, and is stored in the form of "PDF". The color blocks shown in FIG. 4 are green blocks having light and dark variations. However, it should be noted that FIG. 4 could just be shown in black and white due to printing, and will be explained by words as far as possible.

Step 2: Calculating and Ranking the Chromatic Aberration of Each Spot Color Block In accordance with the following expressions, the chromatic aberration of each spot color is calculated by using the chromaticity values of n spot color blocks output by the measurement device in step 1:

$$\Delta E_i = \sqrt{\Delta L_i^2 + \Delta a_i^2 + \Delta b_i^2}$$

$$i \in [0, n-1]$$

$$\Delta L_i = L_{measurement\ i} - L_{target}$$

$$i \in [0, n-1]$$

$$\Delta a_i = a_{measurement\ i} - a_{target}$$

$$i \in [0, n-1]$$

$$\Delta b_i = b_{measurement\ i} - b_{target}$$

$$i \in [0, n-1]$$

where $L_{measure\ i}$, $a_{measure\ i}$, $b_{measure\ i}$ are measured chromaticity values of n color blocks respectively.

The calculated chromatic aberrations $\Delta E_i$ are ranked decreasingly and the printing values and measurement values corresponding to the each color block are ranked according to its chromatic aberration, i.e., there is a one-to-one correspondence between the ranked chromatic aberration and the printing value and measurement value.

Step 3: Correcting the Standard Value

The minimal value of the chromatic aberrations of color blocks calculated in step 2 is 2.05. The present standard values are corrected in accordance with the following expressions and the corrected values will be used as standard values of second loop:

$$L_{std} = L_{enumeration} - (L_{measurement} - L_{target}) * \text{rat}$$

$$\text{rat} \in [0, 1]$$

$$a_{std} = a_{enumeration} - (a_{measurement} - a_{target}) * \text{rat}$$

$$\text{rat} \in [0, 1]$$

$$b_{std} = b_{enumeration} - (b_{measurement} - b_{target}) * \text{rat}$$

$$\text{rat} \in [0, 1]$$

where $L_{measure}$, $a_{measure}$, $b_{measure}$ are the spot color measurement values corresponding to the minimum chromatic aberration, and rat is a set correction factor for controlling an amplitude of correcting a spot color.

In the present embodiment, the correction factor rat is chosen empirically as 0.8, and the standard values, measurement values and corrected values corresponding to the minimum chromatic aberration after first loop are shown in table 2.

TABLE 2 the results of first loop and corrected value

| | L | A | B |
|---|---|---|---|
| target value | 36.34 | −39.89 | 9.83 |
| printing value having the minimum chromatic aberration | 37.34 | −40.89 | 10.83 |
| measurement value having the minimum chromatic aberration | 37.24 | 40.95 | 11.34 |
| standard value of present loop | 36.34 | −39.89 | 9.83 |
| corrected value | 35.62 | 39.04 | 8.62 |

Step 4: Circularly Printing

The standard values of second loop for printing calculated in step 3 are as follow:

$$L_{std}=35.62, a_{sp}=-39.04, b_{std}=8.62.$$

The differences of three items of Lab are calculated according to the measurement value and target value corresponding to the minimum chromatic aberration in first loop:

$$\Delta L=0.9, \Delta a=1.06, \Delta b=1.51$$

$\Delta b$ is the biggest as shown in the above expressions, so the number of step sizes of b is k. The Lab coordinate values of n points are calculated in accordance with the following expressions:

The L coordinate value is calculated as:

$$L_{print\ i} = \begin{cases} L_{std} + L_{step2} & i \in [2*n/3, n-1] \\ L_{std} + L_{step1} & i \in [n/3, 2*n/3-1] \\ L_{std} - L_{step0} & i \in [0, n/3-1] \end{cases}$$

where $L_{step\ 0}$, $L_{step\ 1}$, $L_{step\ 2}$ are the values of step size of L.

The coordinate value is calculated as:

$$a_{print\ i} = \begin{cases} a_{std} + a_{step2} & i \in [p*n/3+2k,\ p*n/3+3*k-1] \\ a_{std} + a_{step1} & i \in [p*n/3+k,\ p*n/3+2*k-1] \\ a_{std} - a_{step0} & i \in [p*n/3,\ p*n/3+k-1] \end{cases}$$

$$p \in [0,2]$$

where $a_{step\ 0}$, $a_{step\ 1}$, $a_{step\ 2}$ are the values of step size of a.
The b coordinate value is calculated as:

$$b_{print\ i} = b_{std} + b_{step\ j}$$
$$i = j + k*p,$$
$$j \in [0, k-1],$$
$$p \in [0, n/k]$$

where $b_{step\ i}$ could be chosen from k values of step size of L.

In the present embodiment, the step sizes of second loop are set as follows:

$$L_{step\ 0}, L_{step\ 1}, L_{step\ 2} = -1, 0, 1$$

$$a_{step\ 0}, a_{step\ 1}, a_{step\ 2} = -1, 0, 1$$

$$b_{step\ 0}, \ldots, b_{step\ 5} = -2, -1, 0, 0.5, 1, 2$$

The 54 color blocks are generated according to the standard value and the values of step size, see table 3 as below.

TABLE 3 coordinate values of 54 spot colors of second loop

| order | L | A | B |
|---|---|---|---|
| 1 | 34.62 | −40.04 | 6.62 |
| 2 | 34.62 | −40.04 | 7.62 |
| 3 | 34.62 | −40.04 | 8.62 |
| 4 | 34.62 | −40.04 | 9.12 |
| 5 | 34.62 | −40.04 | 9.62 |
| 6 | 34.62 | −40.04 | 10.62 |
| 7 | 34.62 | −39.04 | 6.62 |
| 8 | 34.62 | −39.04 | 7.62 |
| 9 | 34.62 | −39.04 | 8.62 |
| 10 | 34.62 | −39.04 | 9.12 |
| ... | | | |
| 44 | 36.62 | −39.04 | 7.62 |
| 45 | 36.62 | −39.04 | 8.62 |
| 46 | 36.62 | −39.04 | 9.12 |
| 47 | 36.62 | −39.04 | 9.62 |
| 48 | 36.62 | −39.04 | 10.62 |
| 49 | 36.62 | −38.04 | 6.62 |
| 50 | 36.62 | −38.04 | 7.62 |
| 51 | 36.62 | −38.04 | 8.62 |
| 52 | 36.62 | −38.04 | 9.12 |
| 53 | 36.62 | −38.04 | 9.62 |
| 54 | 36.62 | −38.04 | 10.62 |

The 54 color blocks are output and the values of chromatic aberration of which are measured and ranked to obtain the minimum chromatic aberration of 1.16. Then corrections are performed in accordance with the correction expressions in step 3, and the corrected values are shown in table 4.

TABLE 4 the results of first loop and corrected value

| | L | A | B |
|---|---|---|---|
| target value | 36.34 | −39.89 | 9.83 |
| printing value having the minimum chromatic aberration | 36.62 | −39.04 | 9.62 |
| measurement value having the minimum chromatic aberration | 37.04 | −40.72 | 10.23 |
| standard value of present loop | 35.62 | −39.04 | 8.62 |
| corrected value | 35.06 | 38.38 | 8.30 |

The standard value of third loop for printing is obtained as follows:

$$L_{reference} = 35.06, a_{reference} = -38.38, b_{reference} = 8.30.$$

Three differences of Lab are calculated according to the measurement value and target value corresponding to the minimum chromatic aberration in first loop:

$$\Delta L = 0.70, \Delta a = 0.83, \Delta b = 0.40$$

$\Delta a$ is the biggest as shown in the above expressions, so the number of step sizes of b is k. The Lab coordinate values of n points are calculated in accordance with the following expressions.

The L coordinate value is calculated as:

$$L_{print\ i} = \begin{cases} L_{std} + L_{step2} & i \in [2*n/3,\ n-1] \\ L_{std} + L_{step1} & i \in [n/3,\ 2*n/3-1] \\ L_{std} - L_{step0} & i \in [0,\ n/3-1] \end{cases}$$

where $L_{step\ 0}$, $L_{step\ 1}$, $L_{step\ 2}$ are the values of step size of L.
The coordinate value is calculated as:

$$a_i = a_{std} + a_{step\ j}$$
$$i \in [p*n/3+3*j,\ p*n/3+3j+2],$$
$$j \in [0, k-1],$$
$$p \in [0, 2]$$

where $a_{step\ j}$ could be chosen from k values of step size of a.
The b coordinate value is calculated as:

$$b_{print\ i} = \begin{cases} b_{std} + b_{step2} & i = 9*j+2 \\ b_{std} + b_{step1} & i = 9*j+1 \\ b_{std} - b_{step0} & i = 9*j \end{cases}$$

where $j \in [0, n/3-1]$ where $b_{step\ 0}$, $b_{step\ 1}$, $b_{step\ 2}$ are the values of step size of b.
In the present embodiment, the values of step sizes of L, a, b in the above expressions are set as follows:

$$L_{step\ 0}, L_{step\ 1}, L_{step\ 2} = -1, 0, 1$$

$$a_{step\ 0}, a_{step\ 1}, a_{step\ 5} = -1, 0, 0.5, 1, 2$$

$$b_{step\ 0}, b_{step\ 1}, b_{step\ 2} = -1, 0, 1$$

The 54 color blocks are generated according to the standard value and the values of step size, see table 5.

TABLE 5 chromaticity values of 54 spot colors of second loop

| order | L | A | B |
|---|---|---|---|
| 1 | 34.06 | −40.38 | 7.3 |
| 2 | 34.06 | −40.38 | 8.3 |
| 3 | 34.06 | −40.38 | 9.3 |
| 4 | 34.06 | −39.38 | 7.3 |
| 5 | 34.06 | −39.38 | 8.3 |
| 6 | 34.06 | −39.38 | 9.3 |
| 7 | 34.06 | −38.38 | 7.3 |
| 8 | 34.06 | −38.38 | 8.3 |
| 9 | 34.06 | −38.38 | 9.3 |
| 10 | 34.06 | −37.88 | 7.3 |
| ... | | | |
| 44 | 36.06 | −38.38 | 8.3 |
| 45 | 36.06 | −38.38 | 9.3 |
| 46 | 36.06 | −37.88 | 7.3 |
| 47 | 36.06 | −37.88 | 8.3 |
| 48 | 36.06 | −37.88 | 9.3 |
| 49 | 36.06 | −37.88 | 7.3 |
| 50 | 36.06 | −37.88 | 8.3 |
| 51 | 36.06 | −37.88 | 9.3 |
| 52 | 36.06 | −36.38 | 7.3 |
| 53 | 36.06 | −36.38 | 8.3 |
| 54 | 36.06 | −36.38 | 9.3 |

The 54 color blocks are output and the values of the chromatic aberrations of each color block are measured and ranked. In the present embodiment, the minimal value of the chromatic aberrations of the present loop is 0.54. The corrected values are shown in table 6.

TABLE 6 the results of first loop and corrected value

| | L | A | B |
|---|---|---|---|
| target value | 36.34 | −39.89 | 9.83 |
| printing value having the minimum chromatic aberration | 35.06 | −37.38 | 9.3 |
| measurement value having the minimum chromatic aberration | 36.74 | −39.54 | 9.92 |
| standard value of present loop | 35.06 | −38.38 | 8.30 |
| corrected value | 34.74 | 38.66 | 8.23 |

Then continue the circular printing. The 54 chromaticity values of fourth loop are shown in table 7.

TABLE 7 chromaticity values of 54 spot colors of fourth loop

| order | L | A | B |
|---|---|---|---|
| 1 | 32.74 | −39.66 | 7.23 |
| 2 | 32.74 | −39.66 | 8.23 |
| 3 | 32.74 | −39.66 | 9.23 |
| 4 | 32.74 | −38.66 | 7.23 |
| 5 | 32.74 | −38.66 | 8.23 |
| 6 | 32.74 | −38.66 | 9.23 |
| 7 | 32.74 | −37.66 | 7.23 |
| 8 | 32.74 | −37.66 | 8.23 |
| 9 | 32.74 | −37.66 | 9.23 |
| 10 | 33.74 | −39.66 | 7.23 |
| ... | | | |
| 44 | 35.74 | −37.66 | 8.23 |
| 45 | 35.74 | −37.66 | 9.23 |
| 46 | 36.74 | −39.66 | 7.23 |
| 47 | 36.74 | −39.66 | 8.23 |
| 48 | 36.74 | −39.66 | 9.23 |
| 49 | 36.74 | −38.66 | 7.23 |
| 50 | 36.74 | −38.66 | 8.23 |
| 51 | 36.74 | −38.66 | 9.23 |
| 52 | 36.74 | −37.66 | 7.23 |
| 53 | 36.74 | −37.66 | 8.23 |
| 54 | 36.74 | −37.66 | 9.23 |

The measured minimal value of the chromatic aberrations for printing of fourth loop is 0.71, which means the minimal value of the chromatic aberrations begins to rebound, and then the circular printing is stopped. The spot color value of the color block having the chromatic aberration of 0.54 in third loop is stored as the corrected value of the present spot color.

The method and the apparatus for calibrating a spot color in an enumeration cycling manner provided in the present invention are configured to realize a spot color simulation by searching n color blocks around a target spot color and by way of circular calibration through the above description, that is to say, the chromatic aberration of the spot color is decreased without enlarging the color gamut of a printing device, thereby reducing the cost. Also, the method and the apparatus enlarges the search region of a spot color and correct the target spot color according to measured chromaticity value, thereby improving the efficiency and simulation accuracy of spot color calibration.

What is claimed is:

1. A method for calibrating a spot color, comprising:
    determining a target value for the spot color; and
    calibrating a printing device in an enumeration cycling manner, so that a spot color measurement value of a color block output by the printing device approximates the target value, wherein the calibrating further comprises:
    1) setting the target value as a spot color standard value;
    2) setting a plurality of spot color values centered at the spot color standard value, the spot color standard value and the plurality of spot color values constituting a set of spot color enumeration values;
    3) printing, by the printing device, a color target chart by using the spot color enumeration values;
    4) measuring each color block on the color target chart to obtain a spot color measurement value of the each color block;
    5) determining a chromatic aberration between the spot color standard value and each obtained spot color measurement value;
    6) determining the spot color enumeration value of the color block corresponding to the spot color measurement value having a minimum chromatic aberration;
    7) setting the determined spot color enumeration value which is corrected by a set amplitude as a new spot color standard value;
    8) repeating steps 2 to 7 until a minimal value of the chromatic aberrations begins to rebound, then stopping the repeating and determining the spot color enumeration value of the color block corresponding to the spot color measurement value having a minimum chromatic aberration as a final print value.

2. The method of claim 1, wherein the determining a target value for the spot color further comprises:
    measuring a spot color block on a color card to obtain a color value as the target value for the spot color.

3. The method of claim 1, wherein the printing device has a color space of Lab, and the step of setting a plurality of spot color values centered at the spot color standard value further comprises:

setting step sizes of Lab as:

$$L_{step\ i} = (L_{step\ 0}, \ldots, L_{step\ m-1})$$

$$a_{step\ i} = (a_{step\ 0}, \ldots, a_{step\ z-1})$$

$$b_{step\ i} = (b_{step\ 0}, \ldots, b_{step\ k-1})$$

where m, z, k are numbers of step sizes of Lab respectively;
wherein m*z*k spot color values are obtained by using spot color standard values $L_{std}$, $a_{std}$, $b_{std}$ as center and using $L_{step\ i}$, $a_{step\ i}$, $b_{step\ i}$ as step size.

4. The method of claim 3, further comprising:
determining values of m, a, k based on chromatic aberrations $\Delta L$, $\Delta a$, $\Delta b$ between Lstd, $a_{std}$, $b_{std}$ and spot color target values $L_{target}$, $a_{target}$, $b_{target}$,
wherein m, z, k are ranked according to their values so as to correspond to a rank of $\Delta L$, $\Delta a$, and $\Delta b$.

5. The method of claim 3, wherein the step of determining a chromatic aberration between the spot color standard value and each obtained spot color measurement value is carried out by rule of:

$$\Delta E_i = \sqrt{\Delta L_i^2 + \Delta a_i^2 + \Delta b_i^2}$$

$$i \in [0, n-1]$$

$$\Delta L_i = L_{measurement\ i} - L_{target}$$

$$i \in [0, n-1]$$

$$\Delta a_i = a_{measurement\ i} - a_{target}$$

$$i \in [0, n-1]$$

$$\Delta b_i = b_{measurement\ i} - b_{target}$$

$$i \in [0, n-1]$$

where $L_{measure\ i}$, $a_{measure\ i}$, $b_{measure\ i}$ are measured chromaticity values of n color blocks, respectively.

6. The method of claim 5, wherein the step of setting the determined spot color enumeration value which is corrected by a set amplitude as a new spot color standard value is carried out by rule of:

$$L_{std} = L_{enumeration} - (L_{measurement} - L_{target}) * \text{rat}$$

$$\text{rat} \in [0, 1]$$

$$a_{std} = a_{enumeration} - (a_{measurement} - a_{target}) * \text{rat}$$

$$\text{rat} \in [0, 1]$$

$$b_{std} = b_{enumeration} - (b_{measurement} - b_{target}) * \text{rat}$$

$$\text{rat} \in [0, 1]$$

where $L_{measure}$, $a_{measure}$, $b_{measure}$ represent the spot color measurement values corresponding to the minimum chromatic aberration, and rat is a set correction factor.

7. An apparatus for printing a spot color, comprising:
a target module configured to determine a target value for the spot color; and
a calibration module which comprises:
a standard value module configured for setting the target value as a spot color standard value;
a enumeration value module configured for setting a plurality of spot color values centered at the spot color standard value, the spot color standard value and the plurality of spot color values constituting a set of spot color enumeration values;
a color target module configured for enabling a printing device to print a color target chart by using the spot color enumeration values;
a measurement module configured for measuring each color block on the color target chart to obtain a spot color measurement value of the each color block;
a chromatic aberration module configured for determining a chromatic aberration between the spot color standard value and the each spot color measurement value;
a determination module configured for determining a spot color enumeration value of the color block corresponding to the spot color measurement value having a minimum chromatic aberration;
a correction module configured for setting the determined spot color enumeration value which is corrected by a set amplitude as a new spot color standard value; and
a control module configured to control the enumeration module, the color target module, the measurement module, the chromatic aberration module, the determination module and the correction module to repeat their respective functioning until a minimal value of the chromatic aberrations begins to rebound, and then determine the spot color enumeration value of the color block corresponding to the spot color measurement value having a minimum chromatic aberration as a final print value.

8. The apparatus of claim 7, wherein the calibration module is configured to calibrate the printing device in an enumeration cycling manner, so that a spot color measurement value of a color block output by the printing device approximates the target value.

9. The apparatus of claim 7, wherein the printing device has a color space of Lab, and the setting the plurality of spot color values centered at the spot color standard value further comprises:

setting step sizes of Lab as:

$$L_{step\ i} = (L_{step\ 0}, \ldots, L_{step\ m-1})$$

$$a_{step\ i} = (a_{step\ 0}, \ldots, a_{step\ z-1})$$

$$b_{step\ i} = (b_{step\ 0}, \ldots, b_{step\ k-1})$$

where m, z, k are numbers of step sizes of Lab respectively;
m*z*k spot color values are obtained by using spot color standard values $L_{std}$, $a_{std}$, $b_{std}$ as center and using $L_{step\ i}$, $a_{step\ i}$, $b_{step\ i}$ as step size.

10. The apparatus of claim 9, wherein:
values of m, a, k are determine based on chromatic aberrations $\Delta L$, $\Delta a$, $\Delta b$ between Lstd, $a_{std}$, $b_{std}$ and spot color target values $L_{target}$, $a_{target}$, $b_{target}$,
wherein m, z, k are ranked according to their values so as to correspond to a rank of $\Delta L$, $\Delta a$, and $\Delta b$.

11. The apparatus of claim 9, wherein the calibration module is configured to calibrate the printing device in an enumeration cycling manner, so that a spot color measurement value of a color block output by the printing device approximates the target value.

12. The apparatus of claim 11, wherein:
values of m, a, k are determined based on chromatic aberrations $\Delta L$, $\Delta a$, $\Delta b$ between Lstd, $a_{std}$, $b_{std}$ and spot color target values $L_{target}$, $a_{target}$, $b_{target}$,
wherein m, z, k are ranked according to their values so as to correspond to a rank of $\Delta L$, $\Delta a$, and $\Delta b$.

13. The apparatus of claim 11, wherein the step of determining a chromatic aberration between the spot color standard value and each obtained spot color measurement value is carried out by rule of:

$$\Delta E_i = \sqrt{\Delta L_i^2 + \Delta a_i^2 + \Delta b_i^2}$$

$i \in [0, n-1]$ $\Delta L_i = L_{measurement\ i} - L_{target}$ $i \in [0, n-1]$ $\Delta a_i = a_{measurement\ i} - a_{target}$ $i \in [0, n-1]$ $\Delta b_i = b_{measurement\ i} - b_{target}$ $i \in [0, n-1]$ where $L_{measure\ i}$, $a_{measure\ i}$, $b_{measure\ i}$ are measured chromaticity values of n color blocks, respectively.

14. The apparatus of claim 9, wherein the step of determining a chromatic aberration between the spot color standard value and each obtained spot color measurement value is carried out by rule of:

$$\Delta E_i = \sqrt{\Delta L_i^2 + \Delta a_i^2 + \Delta b_i^2}$$

$i \in [0, n-1]$ $\Delta L_i = L_{measurement\ i} - L_{target}$ $i \in [0, n-1]$ $\Delta a_i = a_{measurement\ i} - a_{target}$ $i \in [0, n-1]$ $\Delta b_i = b_{measurement\ i} - b_{target}$ $i \in [0, n-1]$ where $L_{measure\ i}$, $a_{measure\ i}$, $b_{measure\ i}$ are measured chromaticity values of n color blocks, respectively.

15. The apparatus of claim 14, wherein the step of setting the determined spot color enumeration value which is corrected by a set amplitude as a new spot color standard value is carried out by rule of:

$L_{std} = L_{enumeration} - (L_{measurement} - L_{target}) * \text{rat}$ $\text{rat} \in [0, 1]$ $a_{std} = a_{enumeration} - (a_{measurement} - a_{target}) * \text{rat}$ $\text{rat} \in [0, 1]$ $b_{std} = b_{enumeration} - (b_{measurement} - b_{target}) * \text{rat}$ $\text{rat} \in [0, 1]$ where $L_{measure}$, $a_{measure}$, $b_{measure}$ represent the spot color measurement values corresponding to the minimum chromatic aberration, and rat is a set correction factor.

* * * * *